United States Patent
Hamaguchi

(10) Patent No.: US 7,189,112 B2
(45) Date of Patent: Mar. 13, 2007

(54) ATTACHING MEMBER TO PANEL HOLE, AND CLAMPING TOOL

(75) Inventor: Tsuyoshi Hamaguchi, Sagamihara (JP)

(73) Assignee: Nifco Inc., Yokohama (JP)

( * ) Notice: Subject to any disclaimer, the term of this patent is extended or adjusted under 35 U.S.C. 154(b) by 50 days.

(21) Appl. No.: 11/231,870

(22) Filed: Sep. 22, 2005

(65) Prior Publication Data
US 2006/0068642 A1   Mar. 30, 2006

(30) Foreign Application Priority Data
Sep. 24, 2004   (JP) ............................. 2004-277043

(51) Int. Cl.
*H01R 11/20* (2006.01)
(52) U.S. Cl. ............ 439/567; 411/551; 411/508; 24/581.1
(58) Field of Classification Search ........... 439/389; 411/551, 508; 24/581.1
See application file for complete search history.

(56) References Cited

U.S. PATENT DOCUMENTS 4,701,984 A * 10/1987 Wyckoff .............. 24/581.1
5,281,149 A * 1/1994 Petri ..................... 439/66
6,773,268 B1 * 8/2004 Shipe et al. ............ 439/74

FOREIGN PATENT DOCUMENTS

| JP | 2002-36873 | 2/2002 |
| JP | 2002-39131 | 2/2002 |

* cited by examiner

*Primary Examiner*—Truc Nguyen
(74) *Attorney, Agent, or Firm*—Manabu Kanesaka

(57) ABSTRACT

An attachment device to a panel hole includes a female part fitted into the panel hole, and having a pass-through part on a side thereof, and a male part having a leg part inserted into the female part. The leg part has an elastic coupling claw projecting outward from the pass-through part to be coupled in the panel hole, and a turn lock part. A guide member is formed in the female part for guiding rotation of the male part. The male part is assembled with the female part to be capable of rotation from a coupled position to an uncoupled position. A turn lock receiving part is formed in the female part and has a lock receiving surface for impeding rotation of the male part toward the uncoupled position.

8 Claims, 18 Drawing Sheets

ATTACHING MEMBER TO PANEL HOLE, AND CLAMPING TOOL

BACKGROUND OF THE INVENTION AND RELATED ART STATEMENT

The invention relates to an improvement of an attaching member to be attached to a panel such as a body panel of an automobile by being fitted into a panel hole piercing through this panel, as well as a clamping tool constituted to include such attached body.

There is a sun visor holder, which is constituted by a grommet member inserted into an interior material attachment hole and coupled to the interior material by a holding piece, and a holder member which is inserted into this grommet member to be capable of rotation and has a coupling claw projecting outward from a space formed on the side of this grommet member and couples to a panel attachment hole. (See Patent Document 1)

However, in such sun visor holder, the panel attachment hole is coupled into by only the coupling claw of the holder member, and the grommet member itself is not coupled to the body panel.

Also, in such sun visor holder, it is made such that when the holder member is twisted about 90 degrees from the coupled position in which the coupling claw of the holder member is projected out from the space, the side of this coupling claw is pushed against the edge of this space, the coupling claw is bent inward and enters into the grommet member, and the coupling between the panel attachment hole and this coupling claw is released, However, because the coupling claw is difficult to bend under the force around the axis of the holder member which is applied to this coupling claw by the twisting of the holder member, a considerable force is required for release of this coupling. That is, the torque in the twisting operation for release becomes greater. From this viewpoint, in such sun visor holder, a sloping surface for release is formed on the coupling claw, but such sloping surface causes a reduction of allowance for coupling of the coupling claw.

Patent Document 1 : Japanese Unexamined Patent Publication No. 2002-36873

This kind of attached member or body to panel hole is constituted by a female part, and a male part having a leg part which is inserted into this female part to be capable of rotation and has an elastic coupling claw which projects outward through a pass-through part formed on the side of the female part and is coupled to a panel hole. The attachment is constituted such that the coupling between the panel hole and the male part can be released by rotational operation of the male part from a coupled position in which the coupling claw is made to project out from the pass-through part toward an uncoupled position in which this elastic coupling claw is drawn into the female part.

The invention has been made to solve the conventional problems, and an object of the invention is to provide an attaching member wherein function of releasably impeding rotation of a male part is not combined in an elastic coupling claw.

SUMMARY OF THE INVENTION

In order to solve the aforementioned problem, in this invention, the attached body to panel hole is constituted by (1)–(5) below, it comprises (1) a female part which is fitted into a panel hole and is coupled and fixed in this panel hole, and (2) a male part which has a head part, and a leg part inserted into this female part, and the leg part has an elastic coupling claw which projects outward from a pass-through part formed on the side of the female part and is coupled in the panel hole;

(3) a guide surface for guiding rotation of the male part with the leg part of this male part as axis of rotation is formed inside the female part, and it is made such that the male, part is combined in the female part to be capable of rotation from a coupled position in which the elastic coupling claw projects out from the pass-through part toward an uncoupled position in which this elastic coupling claw is drawn into the female part;

(4) moreover, a turn lock receiving part having a lock receiving surface for impeding the rotation of the male part toward the uncoupled position by striking against a lock surface facing the front side of this rotation of a turn lock part formed on this male part is formed on the female part, and also (5) it is made such that either one or both of these turn lock part and turn lock receiving part is/are elastically deformed toward a direction of releasing the striking between the lock surface and the lock receiving surface by rotational operation of the male part toward the uncoupled position.

By such constitution, the elastic coupling claw of the male part, which has the leg part inserted into the female part coupled and fixed in the panel hole, can be coupled in the panel hole through the pass-through part of the female part, whereby the male part can be fastened in the panel hole. Also, by rotating the male part thus fastened toward the uncoupled position inside the female part, the elastic coupling claw can be caused to be drawn into the female part, whereby the coupling between the male part and the panel hole is released and the male part can be removed from the panel hole while leaving the female part in the panel hole. Also, because such rotation toward the uncoupled position of the male part is impeded by the striking between the lock surface of the turn lock part and the lock receiving surface of the turn lock receiving part, the male part is not unexpectedly rotated so that the fastened state between the panel hole and the male part is released.

On the other hand, the rotation of the male part toward the uncoupled position can be assured by releasing the striking between the lock surface and the lock receiving surface by the elastic deformation. Although the elastic coupling claw of the male part is projected outward from the pass-through part of the female part in a state in which it is capable of being drawn into the female part by rotation toward the uncoupled position, because the turn lock part and the turn lock receiving part are formed separately from these elastic coupling claw and pass-through part, and the impeding of the rotation of the male part toward the uncoupled position is not realized by causing the elastic coupling claw to strike against the pass-through part, the elastic coupling claw is not caused to be deformed unreasonably in this rotation. Also, the elastic deformation for this rotation can be made easier to cause, and there is also no need to form a guide surface, or the like, on the elastic coupling claw for guiding the deformation of this elastic coupling claw in a manner so as to decrease the coupling allowance (coupling surface) of this elastic coupling claw.

The turn lock part may be formed further forward from the position of formation of the elastic coupling claw on the leg part of the male part, and the turn lock receiving part may be formed further back from the position of formation of the guide surface on the female part.

In this case, the turn lock part and the turn lock receiving part can be laid out rationally in different positions than the elastic coupling claw and the pass-through part.

The turn lock receiving part may be constituted as an elastic piece which extends in an arc shape toward the front side of rotation of the leg part of the male part having one end of the piece integrally connected to the inner wall of the female part and having the lock receiving surface on the other end of the piece.

In this case, because such elastic piece extends in an arc shape following the direction of rotation of the male part and also has a fixed length, such elastic piece is deformed smoothly so as to release the striking between the lock surface and the lock receiving surface accompanying rotation of the male part in the coupled position toward the uncoupled position, and the coupling between the male part and the panel hole can be released smoothly.

The female part may be constituted as a square pipe having a contour shape matching a square-shaped panel hole and having a flange which projects outward on the open end of the pipe, and a pass-through part is formed on each of a pair of sides facing back-to-back of the four sides on this female part. Also, an elastic coupling piece having a coupling surface facing the flange may be formed on each of the remaining two sides.

In this case, by springing back at the position where the elastic coupling piece entered into the panel hole after this elastic coupling piece once is bent inward accompanying insertion of the attached body with the other pipe end side of the female part first into this panel hole, the attached body can be fitted in the panel hole with one touch, gripping this panel hole from in and out between this elastic coupling piece and the flange. Also, the elastic coupling claw of the male part, which is projected outward from the pass-through part of the female part, is coupled to the panel hole, and because this elastic coupling claw is coupled in the panel hole on the sides of the two sides facing back-to-back of the four sides of the female part, and the elastic coupling piece is coupled in the panel hole in the manner on the remaining two sides of the female part, the attached body can be fitted stably into the panel hole.

Also, in the rotational operation of the male part toward the uncoupled position, the female part is not rotated together inside the panel hole. Also, the coupling between the female part and the panel hole is not released even if the male part rotated to the uncoupled position is pulled out from the female part, and the expected state of fitting into the panel hole can be reproduced easily by inserting the leg part of the pulled-out male part or a replacement male part into the female part thus coupled in the panel hole. Furthermore, attachment to the panel hole by inserting the leg part of the male part into the female part from a state in which only the female part first was fitted into the panel hole also can be done.

Also, the clamping tool pertaining to this invention is made by forming a linear, tubular or rod-shaped clamping part on the head part of the male part of an attached body to panel hole having the above constitution.

By such clamping tool, by rotating the male part having the clamping part toward the uncoupled position, it can be removed from the panel hole while leaving the female part in the panel hole. In particular, in the case that damage was caused to the clamping part, it can be made usable as the clamping tool easily by replacing the male part.

In the attached body or member to the panel hole pertaining to this invention, because it is made such that the impeding of the rotation of the male part toward the uncoupled position in which the coupling of the elastic coupling claw of the male part to the panel hole is released is accomplished by a turn lock part which is provided separately from this elastic coupling claw, there is no occurrence of the inconvenience that occurs when the function of releasably impeding this rotation of the male part is combined in the elastic coupling claw. Also, in the clamping tool pertaining to this invention, replacement of the male part having the clamping part can be performed easily and suitably in the case when damage was caused to the clamping part.

DETAILED DESCRIPTION OF PREFERRED EMBODIMENTS

Hereinafter, preferred embodiments for implementing this invention is explained based on FIG. 1 through FIG. 27.

Figure 1:
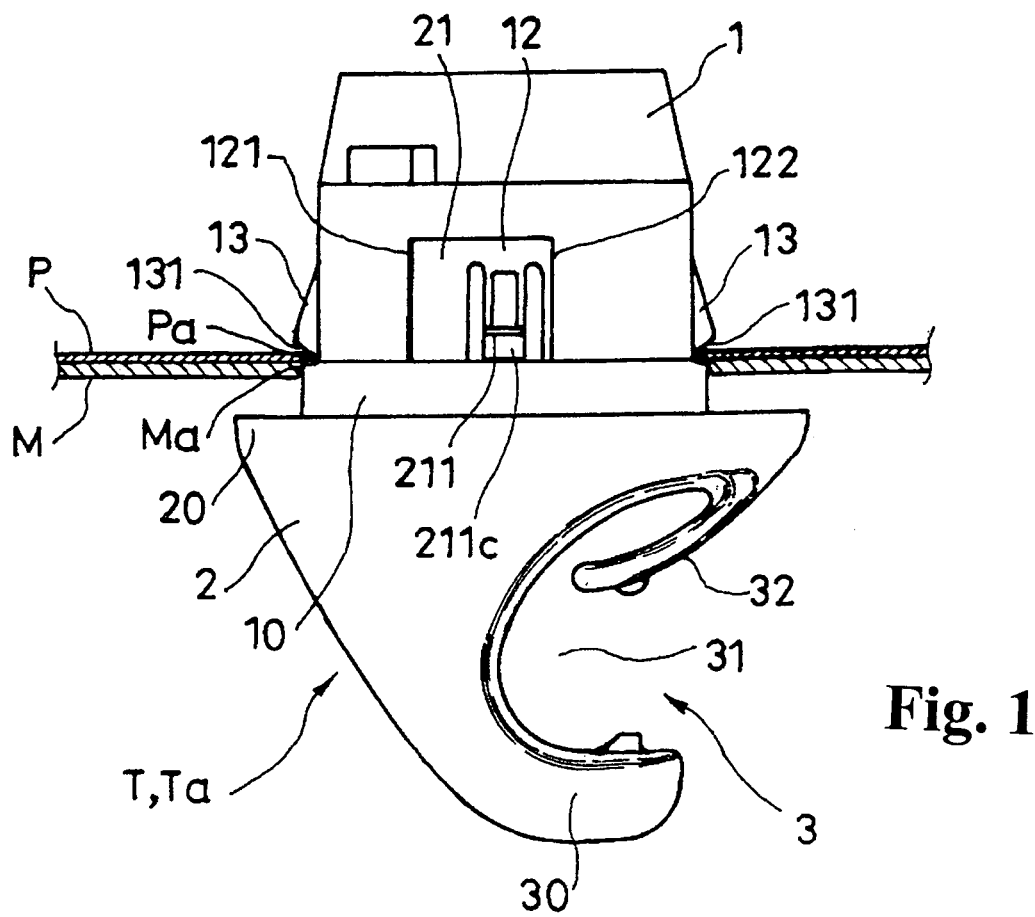
FIG. 1 is a front view showing the condition of use of an attached body T.
Figure 4:
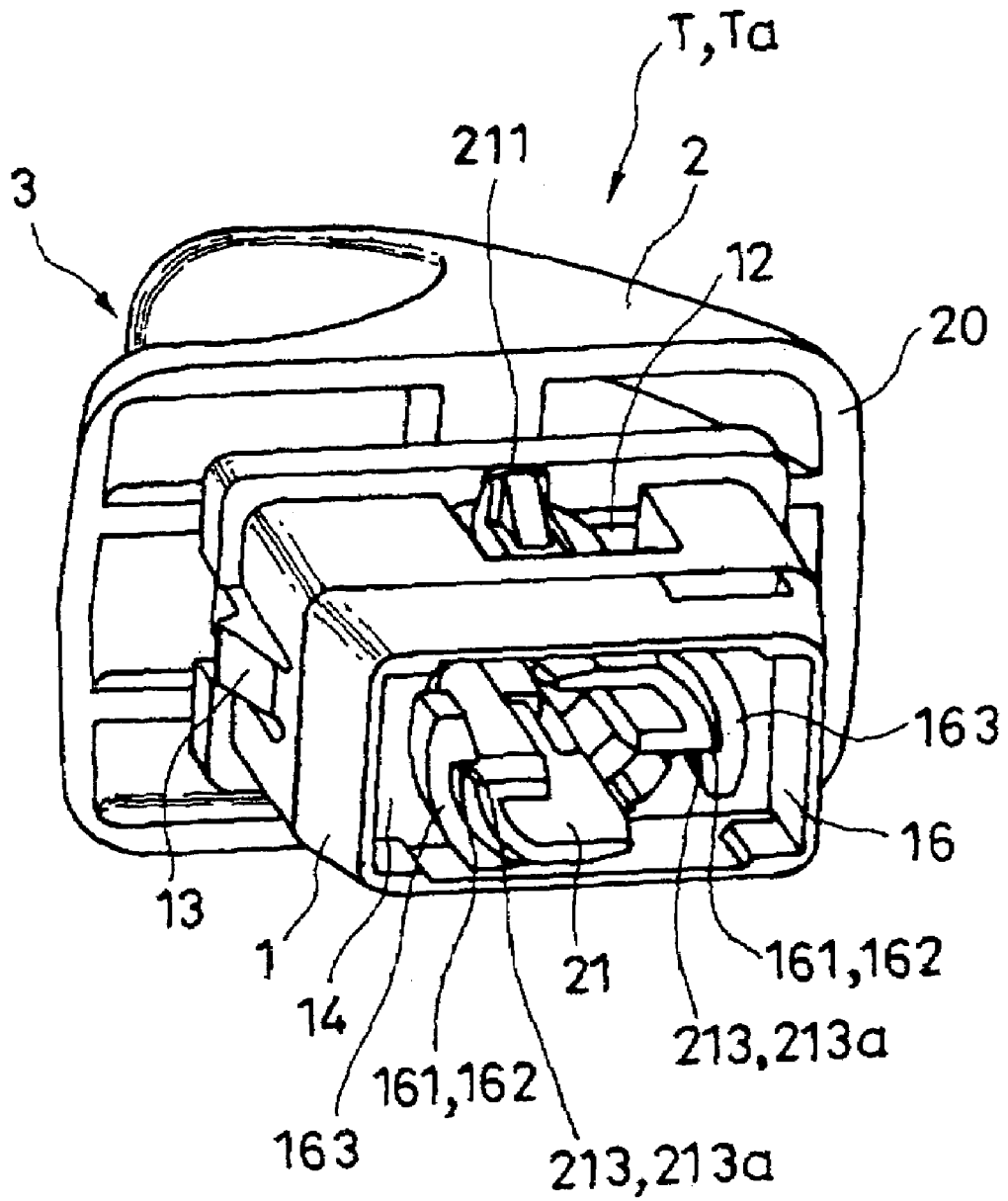
FIG. 4: Structural drawing in perspective view of the same in a state in which a male part is in a coupled position.
Figure 5:
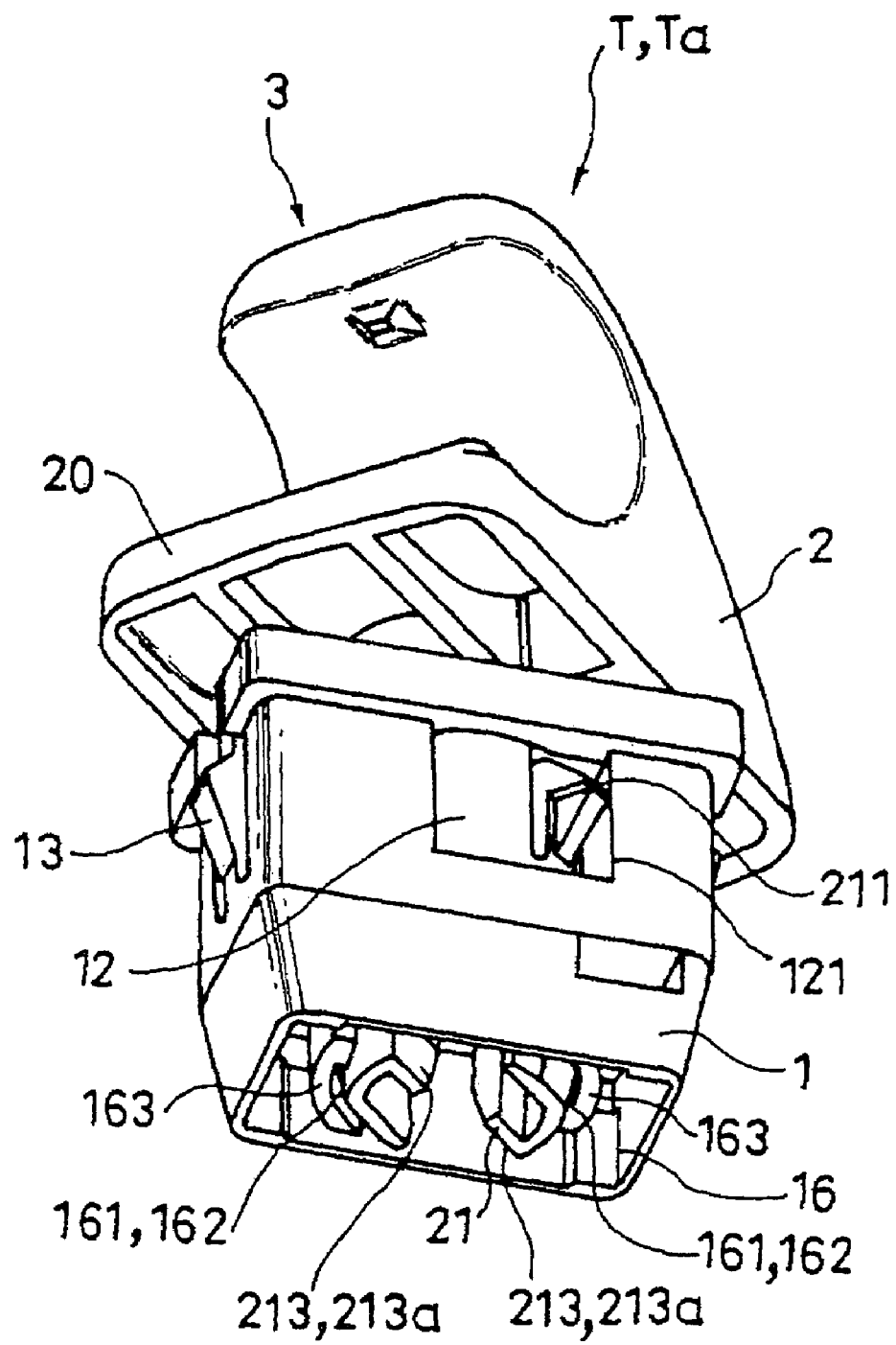
FIG. 5 is a perspective view of the same in a state in which a male part is rotated toward an uncoupled position.
Figure 6:
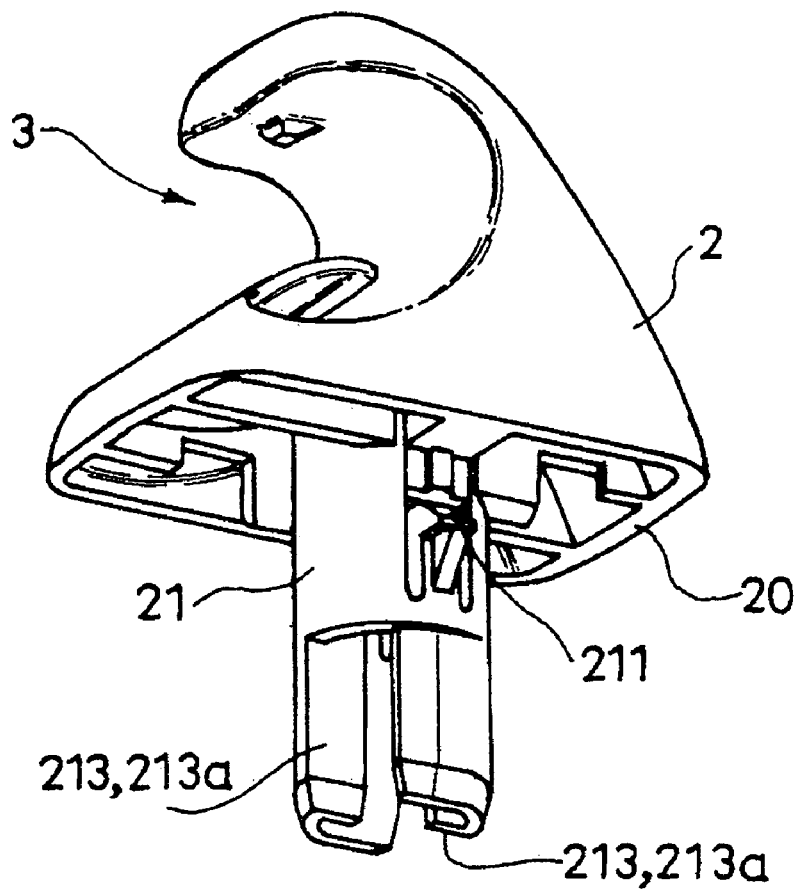
FIG. 6 is perspective view of the same in a detached condition.
Figure 6:
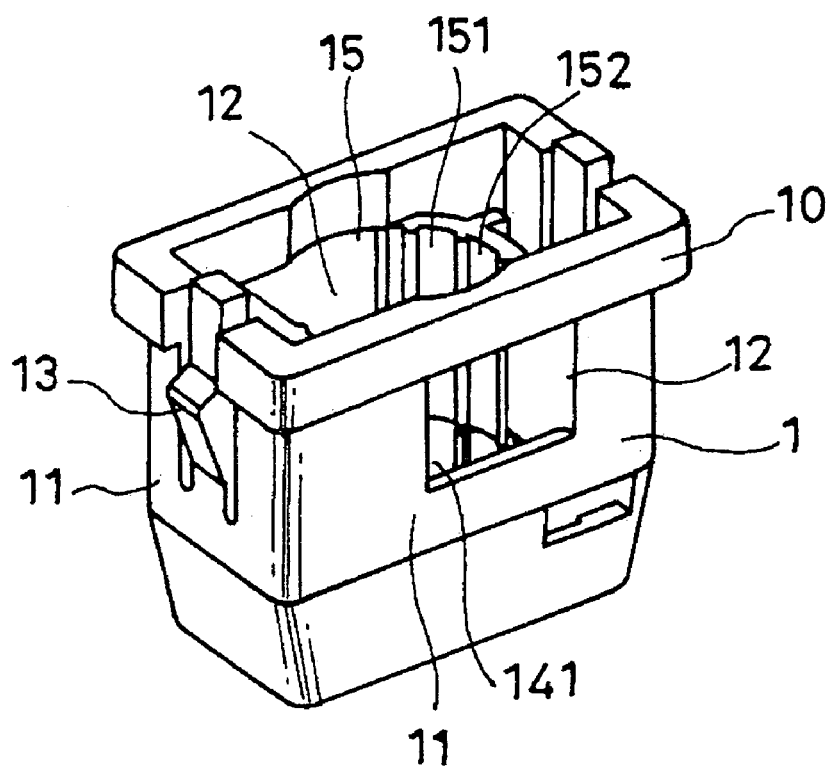
Figure 7:
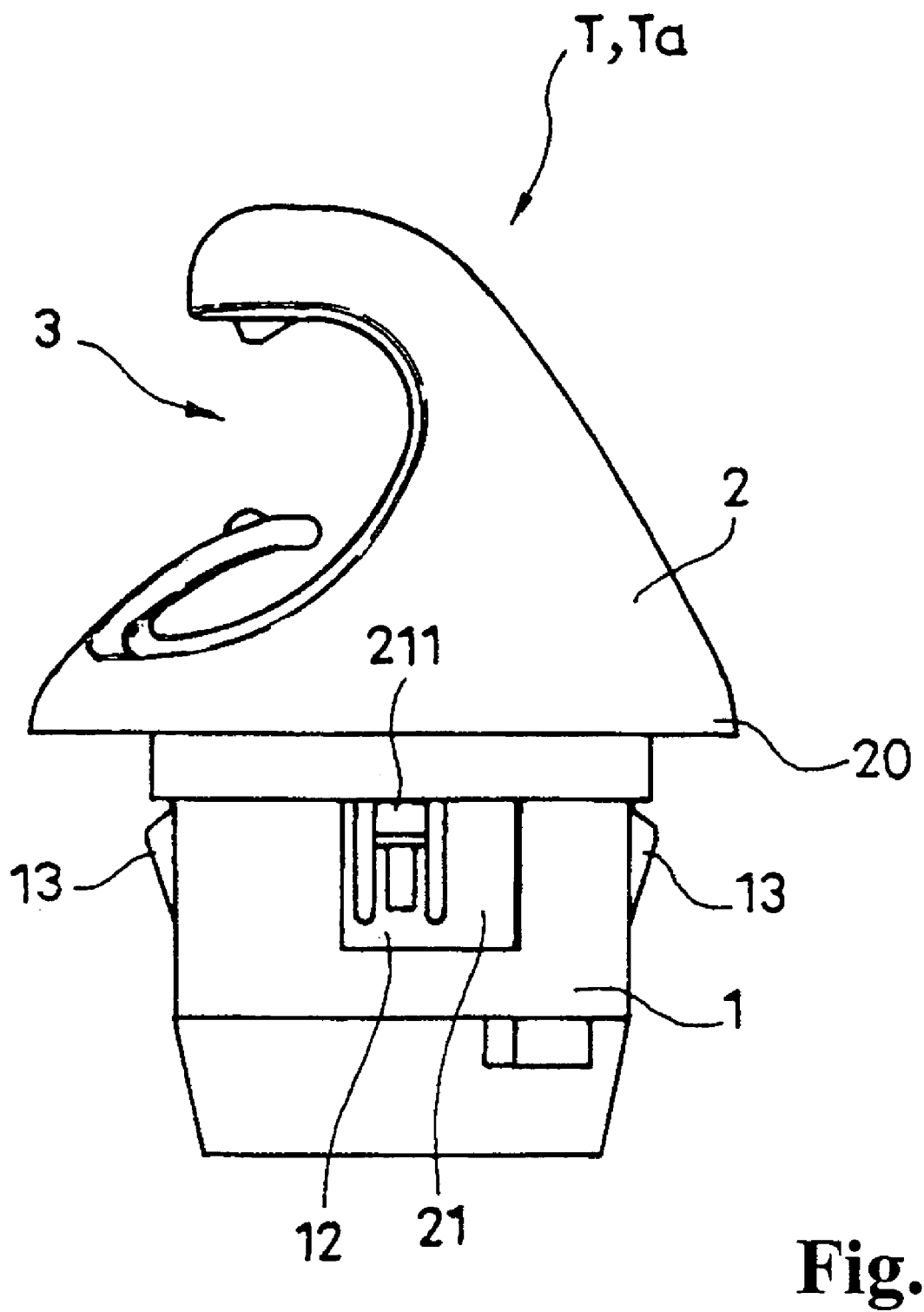
FIG. 7 is a front view of the attached body (clamping tool Ta)
Figure 8:
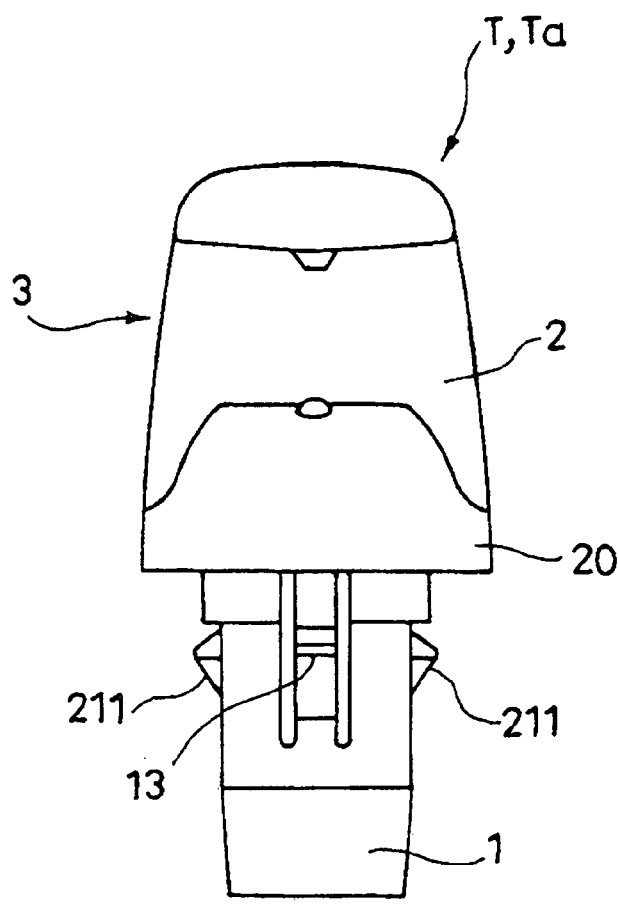
FIG. 8 is a left side view of the same.
Figure 9:
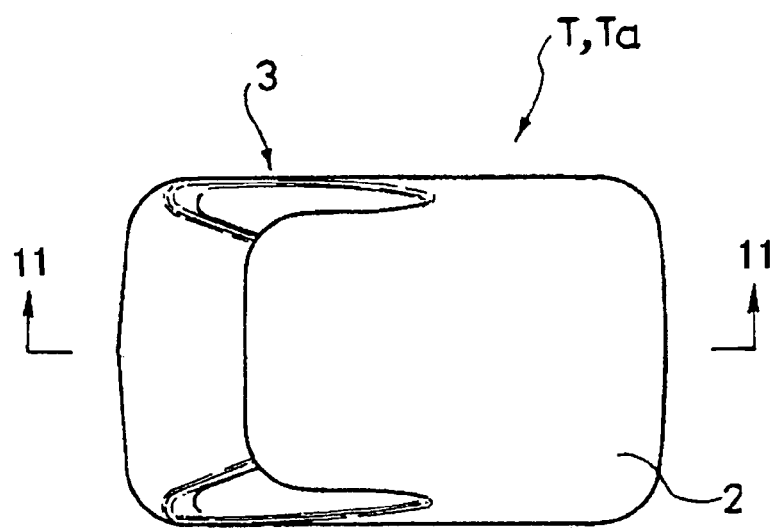
FIG. 9 is a plan view of the same.
Figure 10:
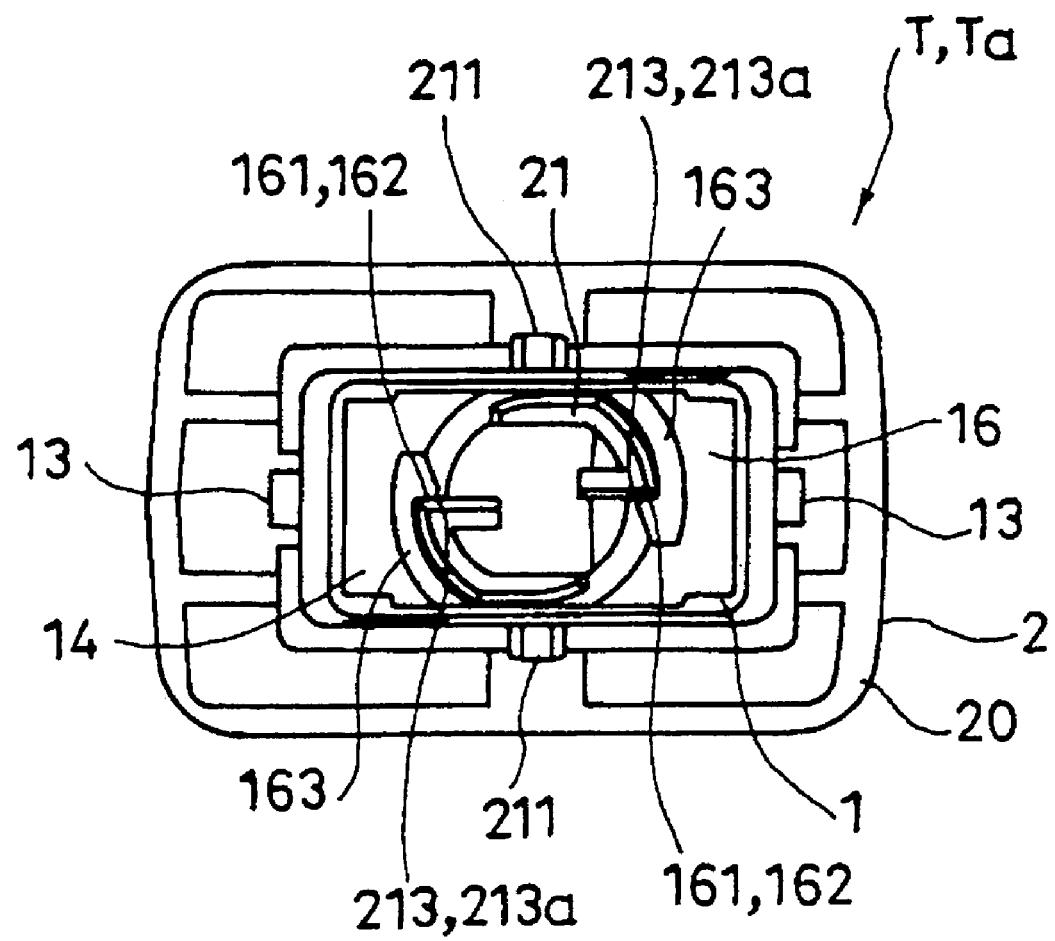
FIG. 10 is a bottom view of the same.
Figure 11:
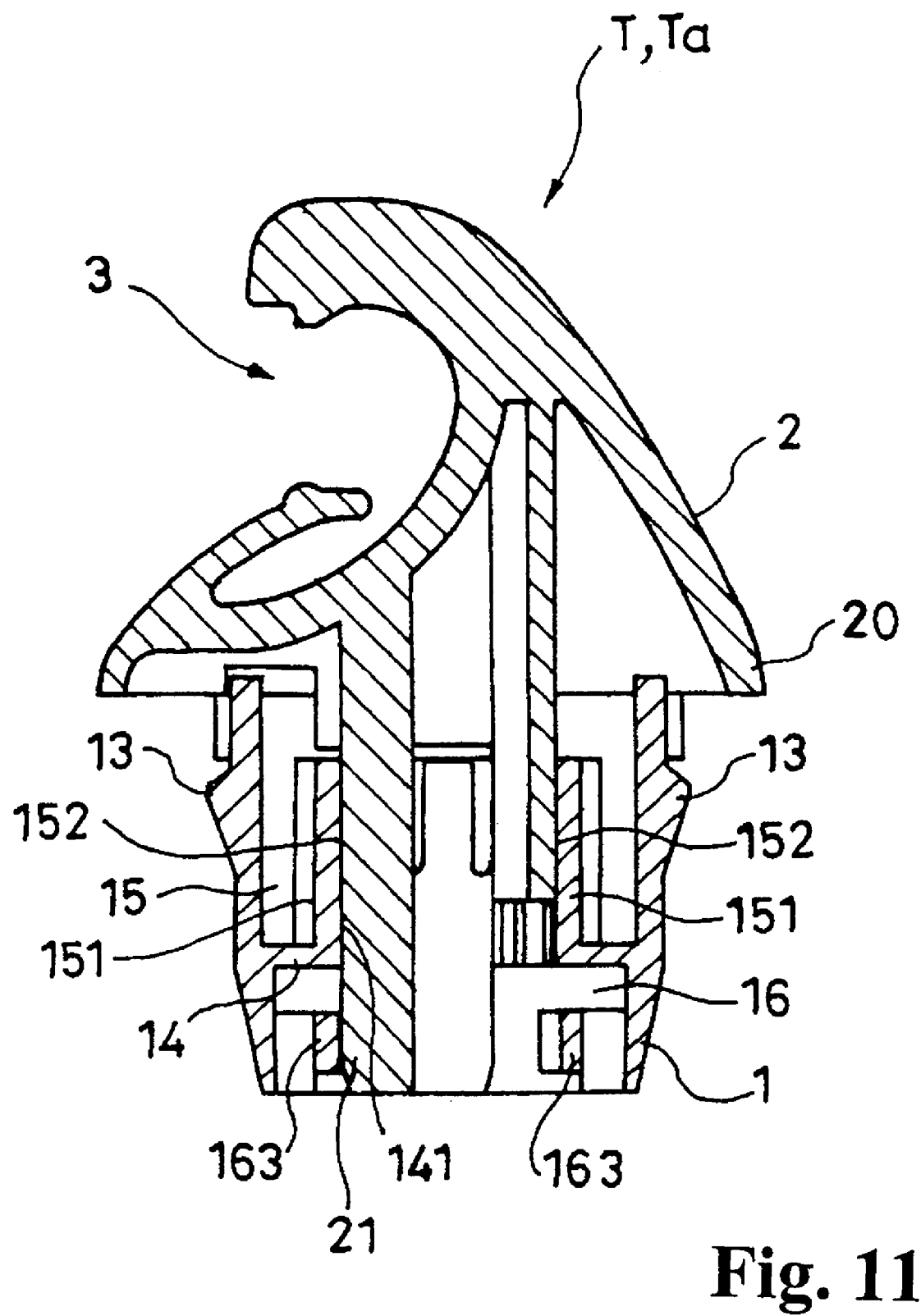
FIG. 11 is a sectional view taken along line 11—11 in FIG. 9.
Figure 12:
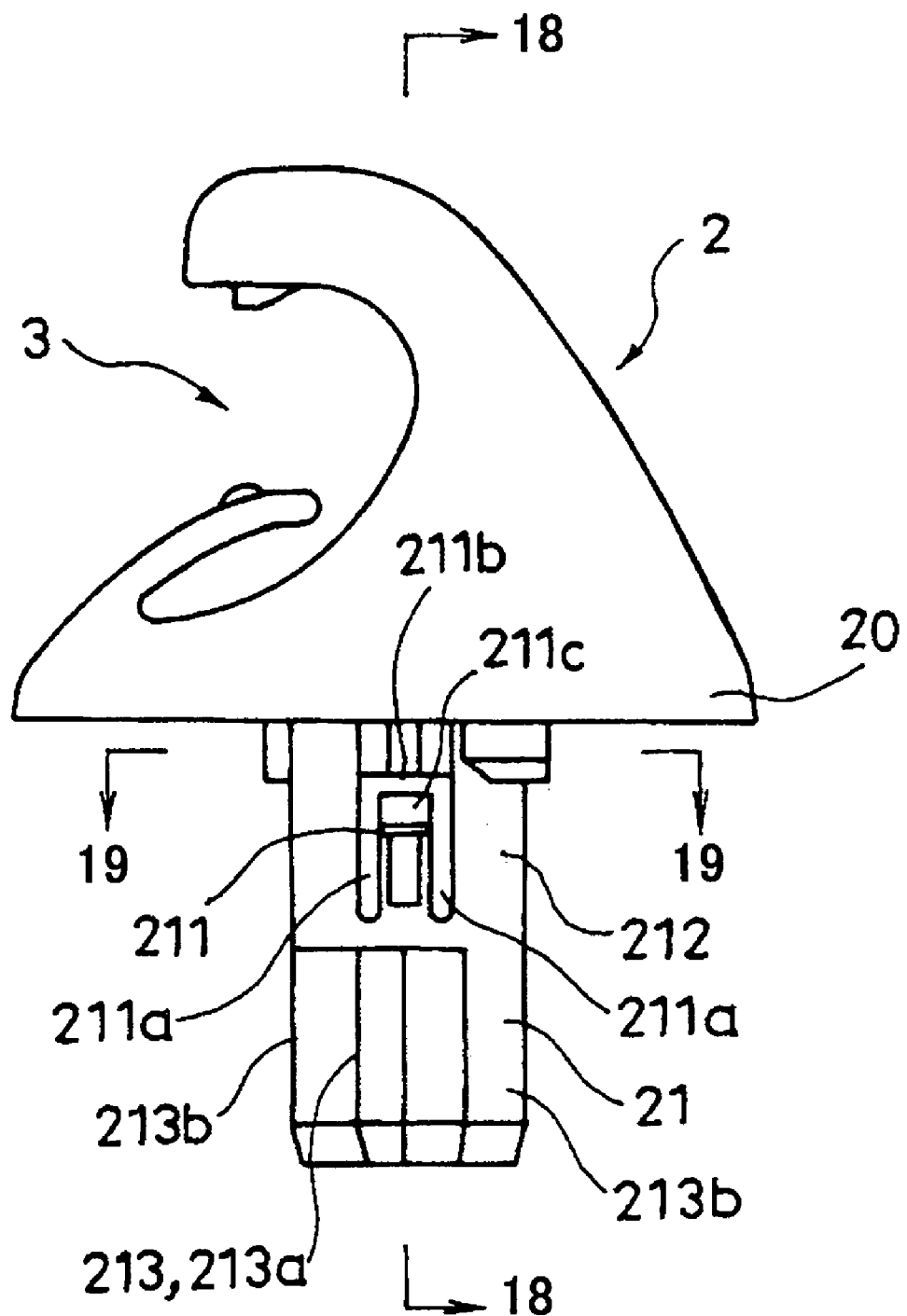
FIG. 12 is a front view of the male part.
Figure 13:
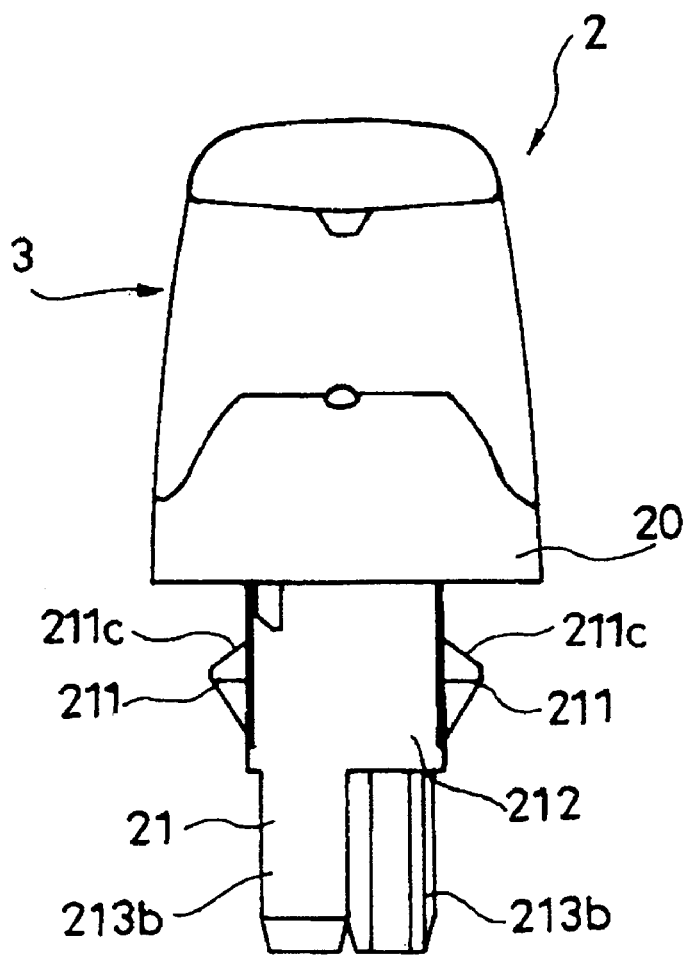
FIG. 13 is a left side view of the same.
Figure 14:
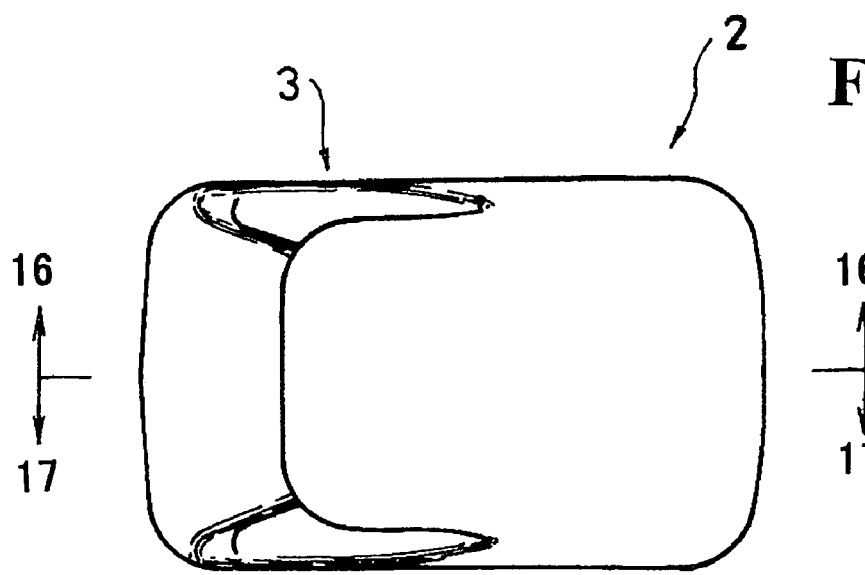
FIG. 14 is a plan view of the same.
Figure 15:
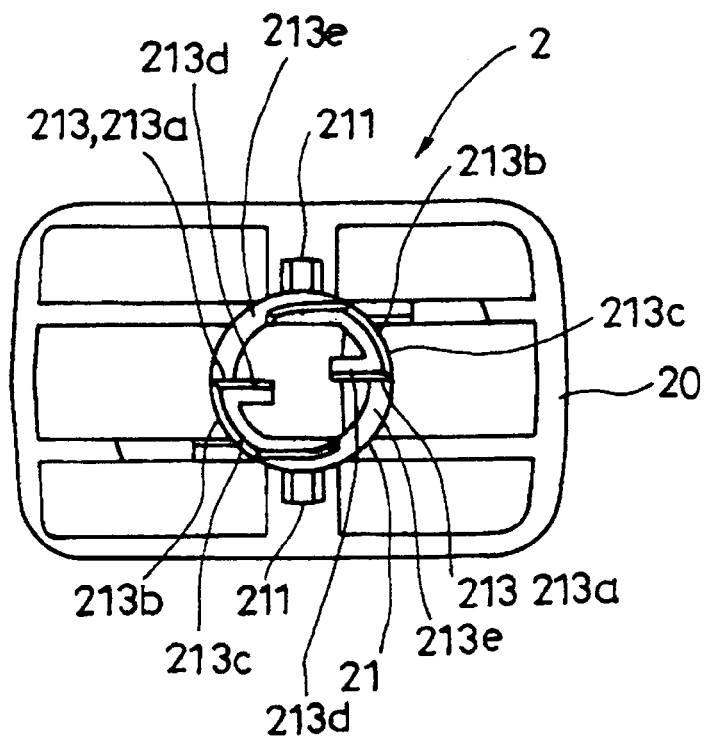
FIG. 15 is a bottom view of the same.
Figure 16:
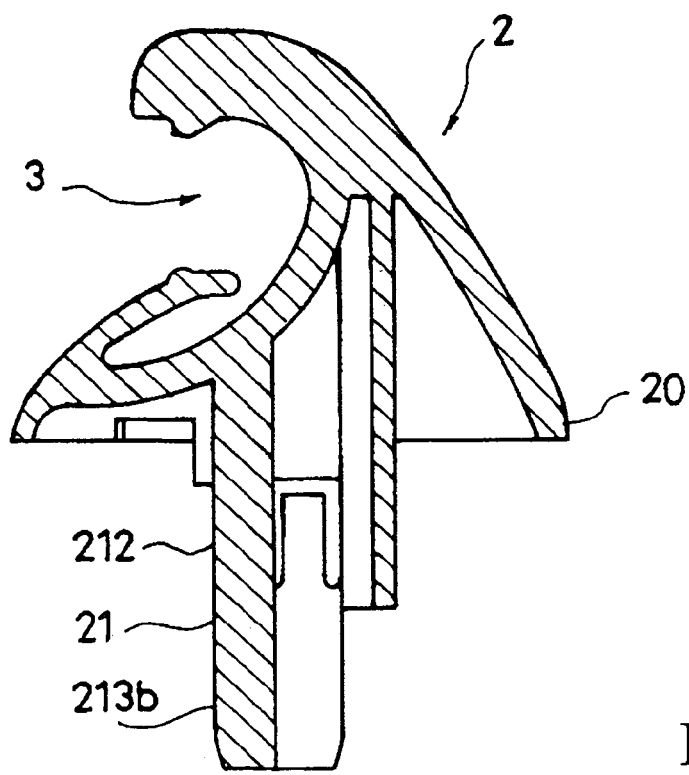
FIG. 16 is a sectional view taken along line 16—16 in FIG. 14.
Figure 17:
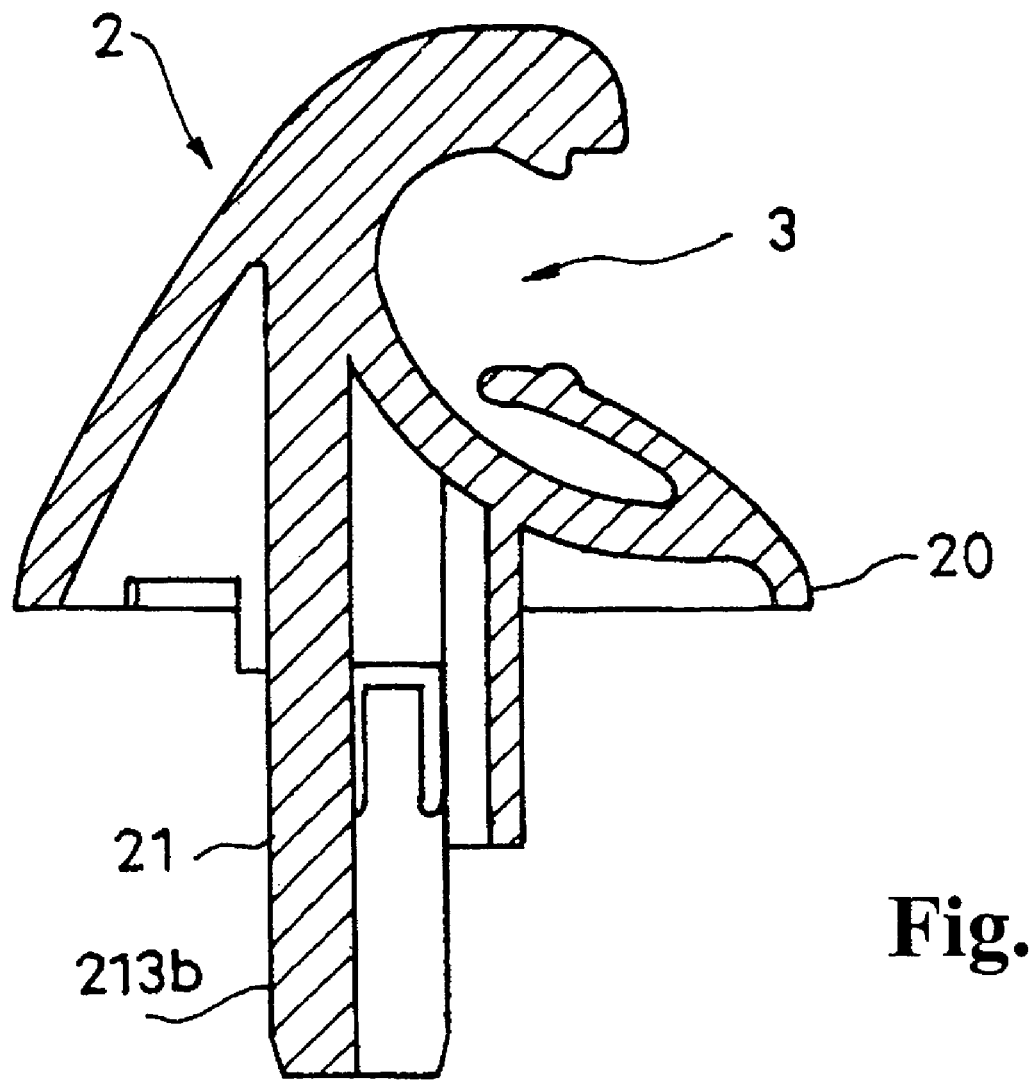
FIG. 17 is a sectional view taken along line 17—17 in FIG. 14.
Figure 18:
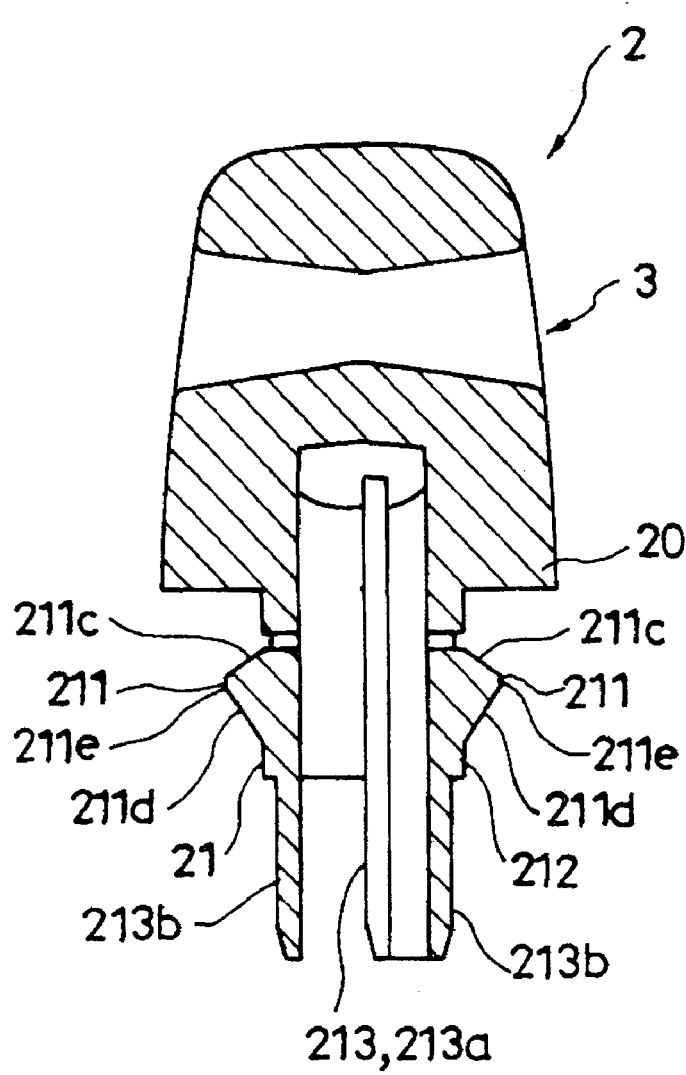
FIG. 18 is a sectional view taken along line 18—18 in FIG. 12.
Figure 19:
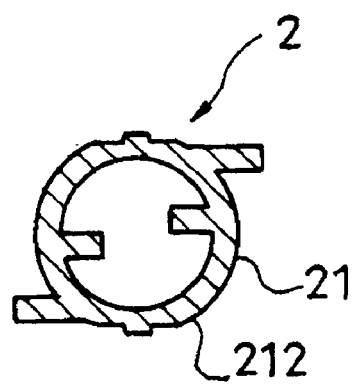
FIG. 19 is a sectional view taken along line 19—19 in FIG. 12.
Figure 20:
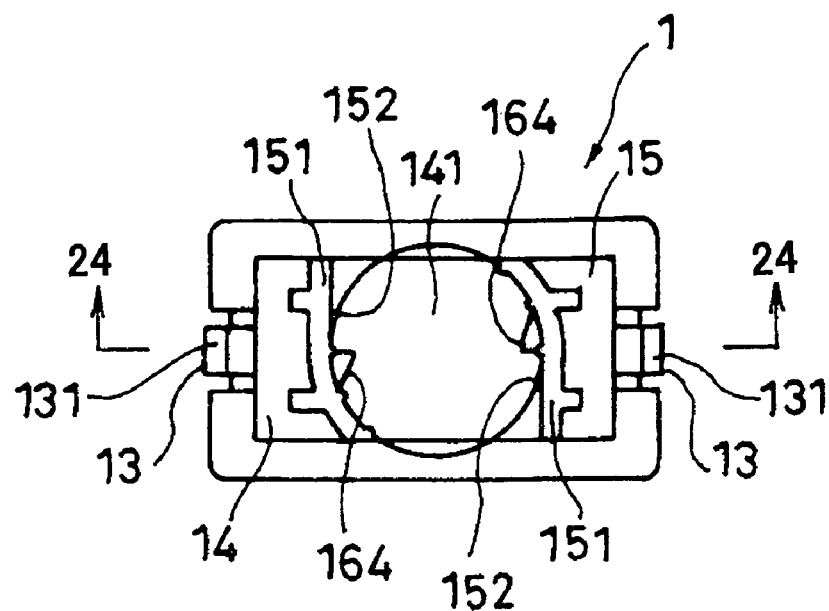
FIG. 20 is a plan view of the female part.
Figure 21:
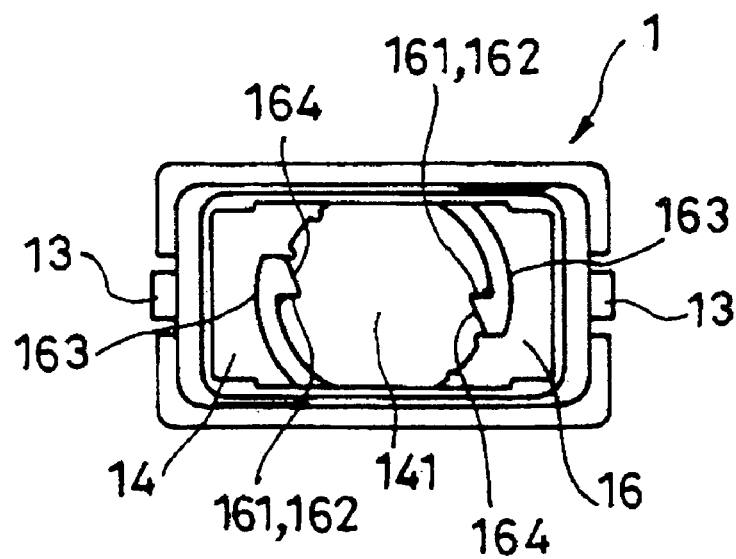
FIG. 21 is a bottom view of the same.
Figure 22:
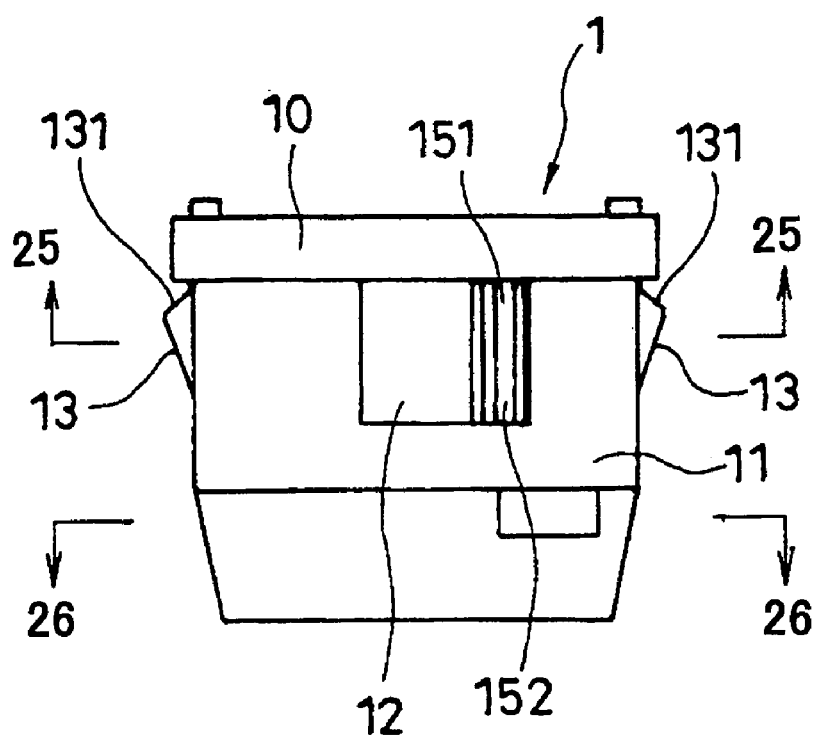
FIG. 22 is a front view of the same.
Figure 23:
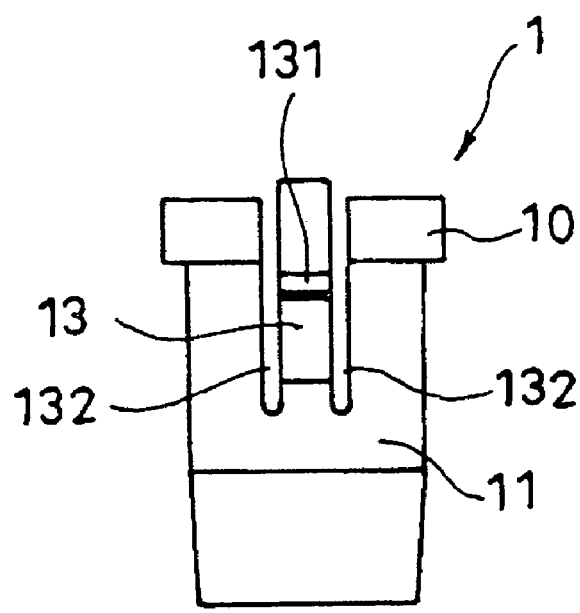
FIG. 23 is a left side view of the same.
Figure 24:
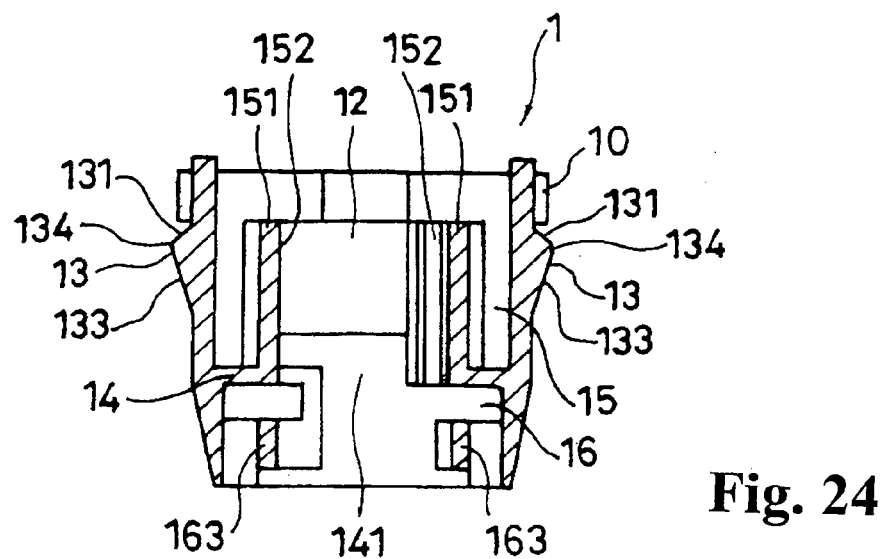
FIG. 24 is a sectional view taken along line 24—24 in FIG. 20.
Figure 27:
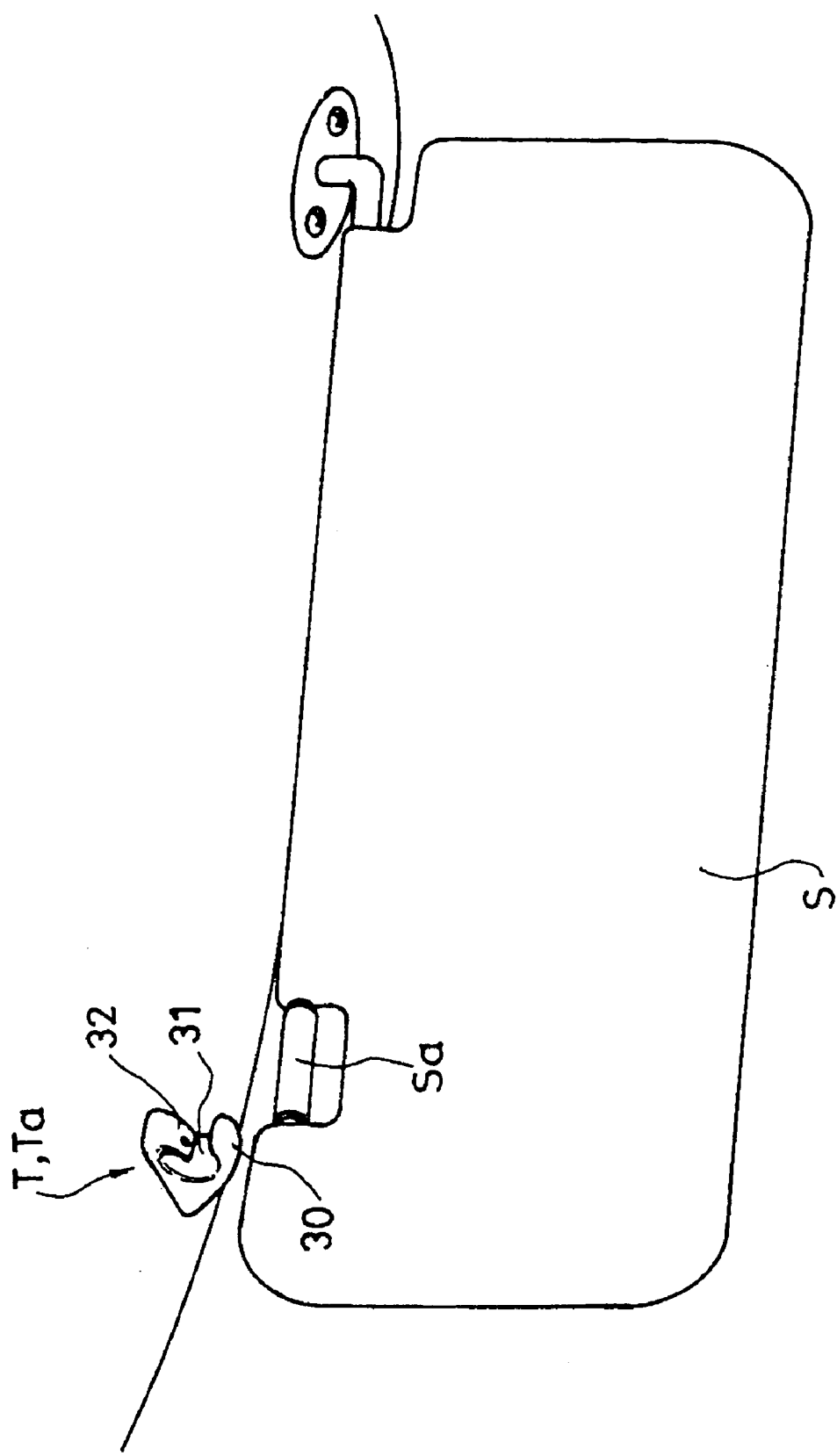
FIG. 27 is a perspective view showing an example of use in which it is made such that a shaft of a sun visor is held by a clamping tool.

FIG. 1 and FIG. 3 through FIG. 11 respectively show a clamping tool Ta including an attached body T pertaining to the embodiment, and in particular, FIG. 1 shows the condition of use in which such clamping tool Ta is attached to a panel hole Pa, also, FIG. 5 shows the state in which the male part 2 was started to rotate toward the uncoupled position from the state in which the male part 2 is in the coupled position in FIG. 4. Also, FIG. 12 through FIG. 19 show the male part 2, and FIG. 20 through FIG. 26 show the female part 1. Also, FIG. 27 shows the condition of use of such clamping tool Ta when it is used as a sun visor clip for holding a shaft Sa of a sun visor S.

The attached body or member T to panel hole Pa pertaining to this embodiment is used for attaching to a panel such as a body panel P of an automobile by being fitted into a panel hole Pa provided in a condition piercing through this panel.

Also, such attached body T can be used by fitting into the panel holes Pa of two or more panels having panel holes Pa so as to combine these two or more panels by means of the attached body T by this fitting.

Also, such attached body T can be used for combining a panel having a panel hole Pa and a part having a through-hole provided on one side of this panel by means of the attached body T, by fitting into this panel hole Pa in a state having the panel hole Pa continuing through to this through-hole.

Also, a clamping tool Ta pertaining to this embodiment is constituted to include such attached body T, and it is used by holding a linear, tubular or rod-shaped body with its clamping part 3 so as to support these on said panel, or the like, by means of this clamping tool Ta.

In the illustrated example, such attached body T is fitted into a panel hole Pa formed on an automobile body panel P lined with a mat-like interior material M on the inside of the vehicle compartment, from the inside of this vehicle compartment through a through-hole Ma formed on this interior material M, so as to be fitted and fixed to this body panel P. (FIG. 1) Also, in the illustrated example, a clamping part 3 is formed on a head part 20 of a male part 2 to be described later which constitutes such attached body T, so that such attached body T functions as a clamping tool Ta. In the illustrated example, the clamping part 3 of such clamping tool Ta is made so as to have a structure suitable for removably holding a shaft Sa of a sun visor S provided inside the vehicle compartment of the automobile. (FIG. 27)

In the illustrated example, such clamping part 3 is formed on the side opposite to the side of formation of a leg part 21 on the head part 20 of the male part 2. Such clamping part 3 has a holding recess 31 opened forward which is formed by a hook-shaped lower projecting part 30, and a restraining piece 32 in which the upper end of the piece is integrally connected on the upper part of the head part and the lower end of the piece is positioned on the bottom side of this holding recess 31. It is constituted such that by inserting a side of a linear, tubular or rod-shaped body into this holding recess 31, this is removably held between the side of the lower end of this restraining piece 32 and the front inner surface of the lower projecting part 30.

Such attached body T is constituted by a female part 1 and a male part 2. The female part 1 is constituted so as to be coupled and fixed in the panel hole Pa by fitting into this panel hole Pa.

In this embodiment, such female part 1 is constituted as a square pipe or hollow member having a contour shape matching a square-shaped panel hole Pa and having a flange 10 which projects outward on the open end of the pipe, and also a pass-through part 12 for an elastic coupling claw 211 of the male part 2 to be described later is formed on each of a pair of sides 11 facing back-to-back of the four sides 11 on this female part 1. An elastic coupling piece 13 having a coupling surface 131 facing the flange 10 is formed on each of the remaining two sides 11.

Concretely, in the illustrated example, such female part 1 is open on both ends of the pipe and the other end of the pipe. Also, it is constituted such that in the four sides 11, the two sides 11 on which the pass-through parts 12 are formed are made wide, and the remaining two sides 11 on which the elastic coupling pieces 13 are formed are made narrower than those.

In the illustrated example, the female part 1 is divided into a front chamber 15 on the one pipe end side and a back chamber 16 on the other pipe end side by a dividing plate part 14 formed in about the middle position in the axial direction of the pipe. A roughly round hole-shaped pass-through hole 141 for the leg part 21 of the male part 2 is formed in the center of this dividing plate part 14, and it is made such that the front end side of the leg part 21 of the male part 2 inserted into the female part 1 from the one pipe end of this female part 1 enters into the back chamber 16 by way of the front chamber 15 through this pass-through hole 141.

Also, the pass-through part 12, in the illustrated example, is constituted as a rectangular hole which pierces through the wide side 11. This pass-through part 12 has its upper edge positioned at the base of the flange 10 and the lower edge positioned somewhat upward from the position of formation of the dividing plate part 14, and it is connected to the front chamber 15 of the female part 1.

In the illustrated example, it is made such that the right edge 121 of the pass-through part 12 following the direction of the pipe axis of the female part 1 on the pass-through part 12 formed on one of the pair of wide sides 11 of the female part 1 is formed more to the right than the left edge 122 of the pass-through part 12 following the direction of the pipe axis of the female part 1 on the pass-through part 12 formed on the other of the pair of wide sides 11 of this female part 1.

Figure 25:
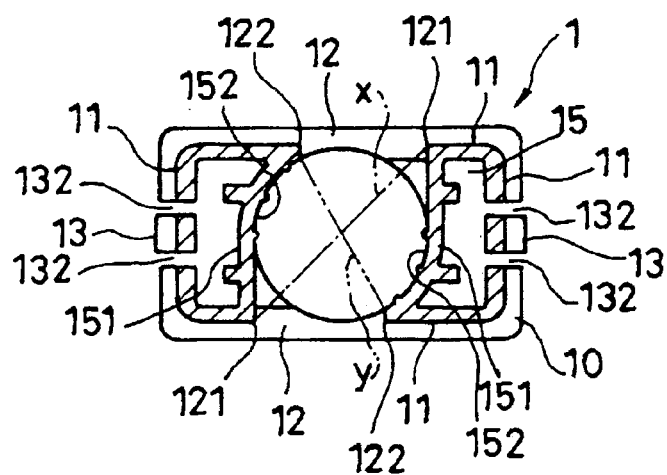
FIG. 25 is a sectional view taken along line 25—25 in FIG. 22.
Figure 26:
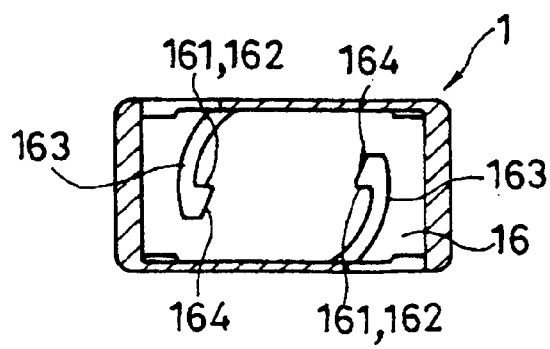
FIG. 26 is a sectional view taken along line 26—26 in FIG. 22.

Also, the left edge 122 of the pass-through part 12 following the direction of the pipe axis of the female part 1 on the pass-through part 12 formed on one of the pair of wide sides 11 of the female part 1 is formed more to the right than the right edge 121 of the pass-through part 12 following the direction of the pipe axis of the female part 1 on the pass-through part 12 formed on the other of the pair of wide sides 11 of this female part 1. (FIG. 25)

Also, inside the front chamber 15, a guide plate part 151 which projects toward one pipe end of the female part 1 from the dividing plate part 14 is formed on each of the two sides surrounding the pass-through hole 141, opening a space between it and the narrow side 11 of the female part 1. Also, it is made such that the plate surface on the side facing the pass-through hole 141 of the guide plate part 151 thus functions as a guide surface 152 for guiding the rotation of the male part 2 to be described later.

One of the pair of guide plate parts 151 is formed so as to cross between the right edge 121 of the pass-through part 12 formed on one of the pair of wide sides 11 of the female part 1 and the left edge 122 of the pass-through part 12 formed on the other of the pair of wide sides of this female part 1.

Also, the other of the pair of guide plate parts 151 is formed so as to cross between the right edge 121 of the pass-through part 12 formed on the other of the pair of wide sides 11 of the female part 1 and the left edge 122 of the pass-through part 12 formed on the one of the pair of wide sides 11 of this female part 1.

Also, each of such pair of guide plate parts 151 is curved toward a direction of widening the space between it and the narrow side 11 as it approaches the place of connection with the left edge 122 of the pass-through part 12.

In the illustrated example, as described later, the elastic coupling claw 211 provided on the leg part 21 of the male part 2 having this leg part 21 inserted into the female part 1 from the one pipe end of this female part 1 is projected outward from said pass-through part 12 leaning toward the left edge 122 of this pass-through part 12 so as to be coupled in the panel hole Pa (coupled position in FIG. 3), and the male part 2 in this coupled position becomes capable of rotation in the direction of causing this elastic coupling claw 211 to be inserted into the female part 1 from the right edge 121 of the pass-through part 12.

That is, in the illustrated example, although the pitch x between the places of connection with the right edges 121 of the pass-through parts 12 on the pair of guide plate parts 151, as described later, becomes a somewhat narrower pitch than the pitch between the tips 211e of the elastic coupling claws 211 formed on both sides in the diameter direction of the leg part 21 of the male part 2, the pitch y between the places of connection with the left edges 122 of the pass-through parts 12 on the pair of guide plate parts 151 becomes an even narrower pitch (FIG. 25). In this structure, the male part 2 in the coupled position becomes capable of rotation only in the direction of causing these elastic coupling claws 211 to be inserted into the female part 1 from the right edges 121 of the pass-through parts 12. Also, by rotation in this direction, that is, by rotation toward the uncoupled position, the coupling between the elastic coupling pieces 13 of the male part 2 and the panel hole Pa is released.

Also, in the illustrated example, on each of the pair of narrow sides 11 of the female part 1, an elastic coupling piece 13 is formed between a pair of notches 132. This pair of notches 132 spans from the dividing plate part 14 to the one pipe end of the female part 1, and the notches opens outward at this one pipe end.

Figure 2:
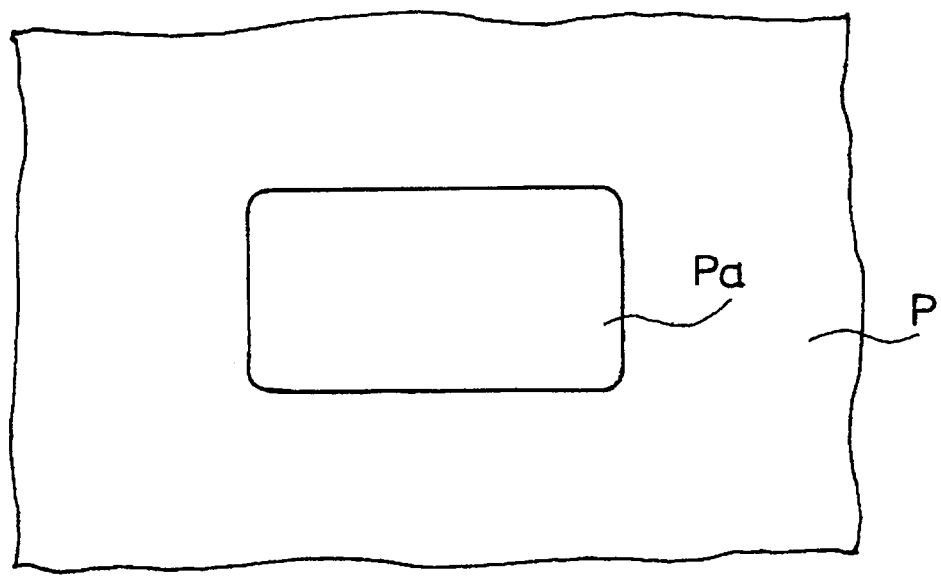
FIG. 2 is a plan view of a panel hole.
Figure 3:
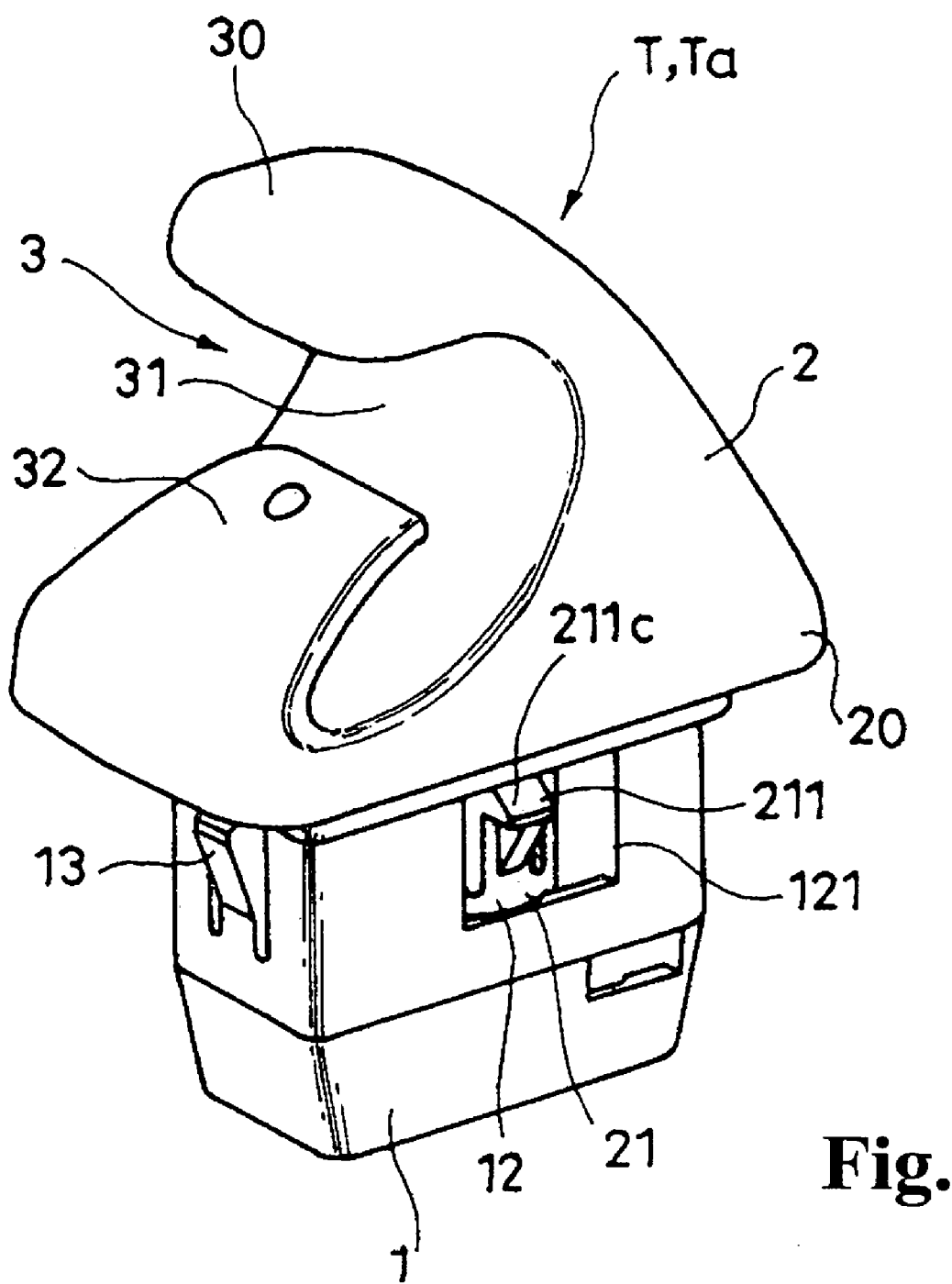
FIG. 3 is a perspective view of the attached body.

In the illustrated example, on the outer surface part of such elastic coupling piece 13, a coupling part having a coupling surface 131 facing the flange 10 at a level somewhat lower than this flange 10, and a sloping surface 133 which projects outward gradually as it approaches the tip 134 on the side opposite this coupling surface 131 sandwiching this tip 134, are formed. Also, in the illustrated example, the pitch between the tips 134 of the coupling parts of the pair of elastic coupling pieces 13 of the female part 1 is made somewhat larger than the pitch between the pair of short sides of the roughly rectangular square hole-shaped panel hole Pa (FIG. 2). Also, although it has a thickness for insertion into such panel hole Pa from the flange 10 to the other pipe end of the female part 1, such flange 10 is constituted to have an outer diameter that doesn't enter into this panel hole Pa.

By this, in this embodiment, by springing back at the position where the coupling surface 131 of this elastic coupling piece 13 entered into the panel hole Pa after this elastic coupling piece 13 once was caused to be bent inward accompanying insertion of the attached body T with the other pipe end side of the female part 1 first into this panel hole Pa, the attached body T can be fitted in the panel hole Pa with one touch, gripping this panel hole Pa from in and out between this coupling surface 131 and the flange 10. Also, the elastic coupling claw 211 of the male part 2, which is projected outward from the pass-through part 12 of the female part 1, is coupled to the panel hole Pa, so that this elastic coupling claw 211 is coupled in the panel hole Pa on the sides of the two sides 11 facing back-to-back of the four sides 11 of the female part 1, and the elastic coupling piece 13 is coupled in the panel hole Pa in the manner on the remaining two sides 11 of the female part 1. Thus, the attached body T can be fitted stably into the panel hole Pa.

Also, in the rotational operation of the male part 2 toward the uncoupled position, the female part 1 is not rotated together inside the panel hole Pa. Also, the coupling between the female part 1 and the panel hole Pa is not released even if the male part 2 rotated to the uncoupled position is pulled out from the female part 1, and the expected state of fitting into the panel hole Pa can be reproduced easily by inserting the leg part 21 of the pulled-out male part 2 or a replacement of male part 2 into the female part 1 thus coupled in the panel hole Pa. Furthermore, attachment to the panel hole Pa by inserting the leg part 21 of the male part 2 into the female part 1 from a state in which only the female part 1 first was fitted into the panel hole Pa also can be done.

Meanwhile, the male part 2 has a head part 20 and a leg part 21 which is inserted into this female part 1, and has on this leg part 21 an elastic coupling claw 211 which projects outward from a pass-through part 12 formed on the side of the female part 1 and is coupled in the panel hole Pa.

In this embodiment, the head part 20 has a base of the leg part 21 integrally connected about the center on one surface side, and also integrally formed with the clamping part 3 on the other surface side.

In the illustrated example, the leg part 21 is provided so as to project out toward a direction intersecting roughly at a right angle to one surface of the head part 20. Also, such leg part 21 is made as a cylindrical part 212 from its base to a position at about the middle in its length direction, and from there, it is made as a turn lock part 213 to be described later. This leg part 21 is inserted into this female part 1 from one pipe end of the female part 1, so that the cylindrical part 212 of the inserted male part 2 is positioned between the pair of guide plate parts 151 inside the front chamber 15 of the female part 1, and the turn lock part 213 is positioned inside the back chamber 16 through the pass-through hole 141.

The elastic coupling claw 211 is formed on each of two sides in the diameter direction of this cylindrical part 212. Such elastic coupling claw 211, in the illustrated example, is formed on the outer surface part of a part of the cylindrical part 212 divided by a pair of vertical notches 211a which follow the direction of the cylinder axis of this cylindrical part 212 and a horizontal notch 211b which crosses between the notch ends in a position on the head part 20 side of this pair of vertical notches 211a. This elastic coupling claw 211 has a coupling surface 211c which faces the head part, and a sloping surface 211d which projects outward gradually as it approaches the tip 211e on the side opposite to this coupling surface 211c sandwiching this tip 211e.

The pitch between the tips 211e of the pair of elastic coupling claws 211 of this male part 2 is made larger than the pitch between the inner surfaces and the outer surfaces of the wide sides 11 of the female part 1. Also, in the illustrated example, by inserting the leg part 21 of the male part 2 into the female part 1 in the direction that the elastic coupling claws 211 face the wide sides 11 of this female part 1, the elastic coupling claws 211 are struck against the inner surfaces of these wide sides 11 and once parts of the cylindrical parts 212 are bent inward, after which, by elastic return at a position where these elastic coupling claws 211 can enter into the pass-through parts 12 of the female part 1, the elastic coupling claws 211 are, coupled in these pass-through parts 12 and the male part 2 and the female part 1 are fastened together. In addition, by the elastic coupling claws 211 which are projected from the pass-through parts 12 in this manner, it is made such that the male part 2 can be further coupled in the panel hole Pa.

That is, in the illustrated example, the pitch between the tips 211e of the pair of elastic coupling claws 211 is made somewhat larger than the pitch between the pair of long sides of said panel hole Pa, and by inserting the attached body T into this panel hole Pa, it is made such that the male part 2 itself also can be fastened in the panel hole Pa with one touch by springing back at the position where the coupling surfaces 211c of the elastic coupling claws 211 entered into the panel hole Pa after such elastic coupling claws 211 once were caused to be bent inward.

Also, the guide surface 152 for guiding the rotation of the male part 2 with the leg part 21 of this male part 2 as axis of rotation is formed inside the female part 1. It is made such that the male part 2 is combined in the female part 1 to be capable of rotation from the coupled position in which the elastic coupling claw 211 projects from the pass-through part 12 toward the uncoupled position in which this elastic coupling claw 211 is drawn into the female part 1 as previously mentioned.

Also, on such female part 1, a turn lock receiving part 161 having a lock receiving surface 162 is formed for impeding the rotation of the male part 2 toward the uncoupled position by striking against a lock surface 213a facing the front side of this rotation of a turn lock part 213 formed on this male part 2.

In the illustrated examples such turn lock part 213 is formed on each of two sides in the diameter direction of the leg part 21 of the male part 2, and also it is constituted by an extension piece 213b which projects with the base end being integrally connected to the terminal end of said cylindrical part 212.

This extension piece 213b has a curved, plate part 213c which has an inner surface and outer surface roughly following the arc of a virtual circle where the outer perimeter surface of the cylindrical part 212 is positioned, and a bent-back plate part 213d which is provided following one circle part of this curved plate part 213c and is formed so as to project toward the center of the virtual circle from this one circle part. Gaps 213e are formed respectively between the bent-back plate part 213d of one of a pair of extension pieces 213b and the other circle part of the other of the pair of extension pieces 213b, and between the bent-back plate 213d of the other of the pair of extension pieces 213b and the other circle part of the one of the pair of extension pieces 213b, and it is made such that the outer surfaces of the bent-back plate parts 213d facing these gaps 213e function as the lock surface 213a.

Also, in this embodiment, it is made such that the turn lock receiving part 161 is elastically deformed toward a direction of releasing the striking between the lock surface 213a and the lock receiving surface 162 by rotation of the male part 2 toward the uncoupled position.

In the illustrated example, such receiving lock part 161 is formed inside the back chamber 16 of the female part 1. Also, such turn lock receiving part 161 has a lock receiving surface 162 which strikes against the lock surface 213a of the turn lock part 213 in the coupled position of the male part 2 having the leg part 21 inserted into the female part 1 so as to cause the elastic coupling claw 211 to project from the pass-through part 12 of this female part 1.

By this, by the attached body T pertaining to this embodiment, the elastic coupling claw 211 of the male part 2, which has the leg part 21 inserted into the female part 1 coupled and fixed in the panel hole Pa, can be coupled in the panel hole Pa through the pass-through part 12 of the female part 1, whereby the male part 2 can be fastened in the panel hole Pa. Also, by rotating the male part 2 thus fastened toward the uncoupled position inside the female part 1, the elastic coupling claw 211 can be drawn into the female part 1, whereby the coupling between the male part 2 and the panel hole Pa is released and the male part 2 can be removed from the panel hole Pa while leaving the female part 1 in the panel hole Pa.

Also, because such rotation toward the uncoupled position of the male part 2 is impeded by the striking between the lock surface 213a of the turn lock part 213 and the lock receiving surface 162 of the turn lock receiving part 161, the male part 2 is not unexpectedly rotated so that the fastened state between the panel hole Pa and the male part 2 is released. On the other hand, the rotation of the male part 2 toward the uncoupled position can be assured by releasing the striking between the lock surface 213a and the lock receiving surface 162 by the elastic deformation.

Although the elastic coupling claw 211 of the male part 2 is projected outward from the pass-through part 12 of the female part 1 in a state in which it is capable of being drawn into the female part 1 by rotation toward the uncoupled position, the turn lock part 213 and the turn lock receiving part 161 are formed separately from these elastic coupling claw 211 and pass-through part 12, and the impeding of the rotation of the male part 2 toward the uncoupled position is not realized by causing the elastic coupling claw 211 to strike against the pass-through part 12. Thus, the elastic coupling claw 211 is not caused to be deformed unreasonably in this rotation, and the elastic deformation for this rotation can be made easier to cause. Also, there is also no need to form a guide surface 152, or the like, on the elastic coupling claw 211 for guiding the deformation of this elastic coupling claw 211 in a manner so as to decrease the coupling allowance of this elastic coupling claw 211.

In this embodiment, the turn lock part 213 is formed further forward from the position of formation of the elastic coupling claw 211, that is, the cylindrical part 212, on the leg part 21 of the male part 2, and the turn lock receiving part 161 is formed in the back chamber 16 further back from the position of formation of the guide surface 152, that is, the front chamber 15, on the female part.

By this, in this embodiment, it is made such that the turn lock part 213 and the turn lock receiving part 161 can be laid out rationally in different positions than the elastic coupling claw 211 and the pass-through part 12.

Also, in this embodiment, the turn lock receiving part 161 is constituted as an elastic piece 163 which extends in an arc shape toward the front side of rotation of the leg part 21 of the male part 2 having one end of the piece integrally connected to the inner wall of the female part 1 and having the lock receiving surface 162 on the other end of the piece.

In the illustrated example, such elastic piece 163 is formed respectively on two sides sandwiching the pass-through hole 141 in the back chamber 16 of the female part 1. Each elastic piece 163 has a head part 164 on the inner surface side of the other end of that piece, and it is made such that the surface facing the one end of the piece on this head part 164 functions as the lock receiving surface 162. Also, each elastic piece 163 is curved so as to follow the pass-through hole 141, and it is constituted such that only the head part 164 of this elastic piece 163 is made to approach inside the pass-through hole 141 in a state viewing the female part 1 from one pipe end.

Also, one of the pair of elastic pieces 163 has one end integrally connected to the inner wall of one of the pair of wide sides 11 of the female part 1, and the other of the pair of elastic pieces 163 has the other end of the piece integrally connected to the inner wall of the other of the pair of wide sides 11 of the female part 1. Also, in the illustrated example, the lock surface 213a of one of the pair of extension pieces 213b constituting the turn lock part 213 of the male part 2, having the leg part 21 inserted into the female part 1 in a direction such that the elastic coupling claw 211 is made to project from the pass-through part 12 of this female part 1, contacts with the lock receiving surface 162 of one of this pair of elastic pieces 163, and the lock surface 213a of the other of the pair of extension pieces 213b constituting this turn lock part 213 contacts with the lock receiving surface 162 of the other of this pair of elastic pieces 163.

Also, it is made such that when the male part 2 is rotated from the coupled position to the uncoupled position, the lock surface 213a of the male part 2 is pushed against the lock receiving surface 162. By this pushing, the elastic piece 163 is elastically deformed such that the other end of that piece is made to spread outward, and by this deformation, the striking between the lock surface 213a and the lock receiving surface 162 is released, and the rotation of the male part 2 to the uncoupled position is allowed.

Because such elastic piece 163 extends in an arc shape following the direction of rotation of the male part 2 and also has a fixed length, such elastic piece 163 is deformed smoothly so as to release the striking between the lock surface 213a and the lock receiving surface 162 accompanying rotation of the male part 2 in the coupled position toward the uncoupled position.

With the clamping tool Ta including the attached body T explained above, by rotating the male part 2 having the clamping part 3 toward the uncoupled position, it can be removed from the panel hole Pa while leaving the female part 1 in the panel hole Pa. In particular, in the case that damage was caused to the clamping part 3, it can be made usable as the expected clamping tool Ta easily by replacing the male part 2.

Provision of the characteristic of elastic deformation to the male part 2 and the female part 1 explained above typically can be assured easily by constituting such male part 2 and female part 1 as plastic molded products.

The disclosure of Japanese Patent Application No. 2004-277043 filed on Sep. 24, 2004 is incorporated herein.

While the invention has been explained with reference to the specific embodiment of the invention, the explanation is illustrative, and the invention is limited only by the appended claims.

What is claimed is:

1. An attachment device to a panel hole, comprising:
   a female part fitted into the panel hole, and having a pass-through part on a side thereof,
   a male part including a head part, and a leg part inserted into the female part and having an elastic coupling claw projecting outward through the pass-through part to be coupled in the panel hole at a side portion and a turn lock part;
   a guide member formed in the female part for guiding rotation of the male part with the leg part as an axis of rotation, said male part being assembled with the female part to be capable of rotation from a coupled position in which the elastic coupling claw projects from the pass-through part to an uncoupled position in which the elastic coupling claw is drawn into the female part; and
   a turn lock receiving part formed in the female part and having a lock receiving surface for impeding rotation of the male part toward the uncoupled position by striking against a lock surface facing a front side of the rotation of the turn lock part, at least one of the turn lock part and turn lock receiving part being elastically deformed toward a direction of releasing the striking between the lock surface and the lock receiving surface by rotational operation of the male part toward the uncoupled position.

2. An attaching device according to claim 1, wherein said turn lock part is formed at a front side relative to the elastic coupling claw on the leg part, and the turn lock receiving part is formed at a rear side relative to the guide surface on the female part.

3. An attaching device according to claim 1, wherein said turn lock receiving part is formed as an elastic piece extending in an arc shape toward a front side of rotation of the leg part, and has one end integrally connected to an inner wall of the female part and the other end with the lock receiving surface.

4. An attaching device according to claim 1, wherein the female part has a rectangular hollow member having a shape matching the panel hole and a flange projecting outward on one open end of the hollow member; said pass-through part is formed on each of a pair of sides facing back-to-back of four sides on the female part; and an elastic coupling piece having a coupling surface facing the flange is formed on each of the remaining two sides.

5. An attaching device according to claim 1, wherein said male part includes a clamping part at the head.

6. A clamping tool comprising a clamping part formed on the head part of the male part according to claim 1, said clamping part receiving an elongated member including a linear, tubular and rod-shaped member.

7. An attaching device according to claim 3, wherein said turn lock receiving part has two receiving parts projecting from two opposing sides of the female parts, and said turn lock part has two lock pars projecting from the leg part along an axis thereof.

8. An attaching device according to claim 7, wherein said female part has a partition extending perpendicular to a central axis of the female part and connected to the guide member.

* * * * *